US012705691B2

(12) United States Patent
Ghandehari

(10) Patent No.: US 12,705,691 B2
(45) Date of Patent: Aug. 11, 2026

(54) ENHANCEMENT OF COARSE RESOLUTION IMAGERY USING SUPER-RESOLUTION AND CONVOLUTION NEURAL NETWORKS TO BE USED FOR FIT-FOR-PURPOSE SYSTEMATIC LAND TITLING AND LAND VALUATION

(71) Applicant: MEDICI LAND GOVERNANCE, Salt Lake City, UT (US)

(72) Inventor: Mehran Ghandehari, Provo, UT (US)

(73) Assignee: MEDICI LAND GOVERNANCE, Salt Lake City, UT (US)

( * ) Notice: Subject to any disclaimer, the term of this patent is extended or adjusted under 35 U.S.C. 154(b) by 159 days.

(21) Appl. No.: 18/271,934

(22) PCT Filed: Jan. 17, 2022

(86) PCT No.: PCT/US2022/012661

§ 371 (c)(1),
(2) Date: Jul. 12, 2023

(87) PCT Pub. No.: WO2022/155565

PCT Pub. Date: Jul. 21, 2022

(65) Prior Publication Data

US 2024/0070808 A1 Feb. 29, 2024

Related U.S. Application Data

(60) Provisional application No. 63/137,842, filed on Jan. 15, 2021.

(51) Int. Cl.

| | |
|---|---|
| ***G06K 9/00*** | (2022.01) |
| ***G06N 3/0464*** | (2023.01) |
| ***G06Q 50/16*** | (2012.01) |
| ***G06T 3/4046*** | (2024.01) |
| ***G06T 3/4053*** | (2024.01) |
| ***G06V 10/774*** | (2022.01) |
| ***G06V 10/82*** | (2022.01) |
| ***G06V 20/10*** | (2022.01) |

(52) U.S. Cl.

CPC ......... *G06T 3/4046* (2013.01); *G06N 3/0464* (2023.01); *G06Q 50/165* (2013.01); *G06T 3/4053* (2013.01); *G06V 10/774* (2022.01); *G06V 10/82* (2022.01); *G06V 20/10* (2022.01)

(58) Field of Classification Search

CPC ...... G06V 10/82; G06V 20/10; G06T 3/4046; G06T 3/4053

See application file for complete search history.

(56) References Cited

U.S. PATENT DOCUMENTS

| | | | | |
|---|---|---|---|---|
| 2008/0260237 | A1* | 10/2008 | Savolainen | G01C 11/025<br>382/154 |
| 2014/0313303 | A1 | 10/2014 | Davis | |
| 2015/0170368 | A1* | 6/2015 | Janky | G06T 7/74<br>382/103 |
| 2016/0300375 | A1* | 10/2016 | Beckett | G06F 16/248 |
| 2019/0073534 | A1 | 3/2019 | Dvir | |
| 2019/0205700 | A1* | 7/2019 | Gueguen | G06T 3/40 |
| 2020/0043135 | A1 | 2/2020 | Chou | |
| 2020/0103552 | A1* | 4/2020 | Phelan | G01W 1/10 |
| 2020/0126191 | A1* | 4/2020 | Munkberg | G06T 5/70 |
| 2020/0401617 | A1* | 12/2020 | Spiegel | G06F 16/587 |

OTHER PUBLICATIONS

Wagner, Lena, Lukas Liebel, and Marco Körner. "Deep residual learning for single-image super-resolution of multi-spectral satellite imagery." ISPRS Annals of the Photogrammetry, Remote Sensing and Spatial Information Sciences 4 (2019): 189-196. (Year: 2019).*

Pineda, Ferdinand, Victor Ayma, and César Beltran. "A generative adversarial network approach for super-resolution of Sentinel-2 satellite images." The International Archives of the Photogrammetry, Remote Sensing and Spatial Information Sciences 43 (2020): 9-14. (Year: 2020).*

Ghaffar, M. A. A., et al. "Data augmentation approaches for satellite image super-resolution." ISPRS Annals of the Photogrammetry, Remote Sensing and Spatial Information Sciences 4 (2019): 47-54. (Year: 2019).*

Shermeyer, Jacob, and Adam Van Etten. "The effects of super-resolution on object detection performance in satellite imagery." Proceedings of the IEEE/CVF Conference on Computer Vision and Pattern Recognition Workshops. 2019. (Year: 2019).*

Wagner, Lena, Lukas Liebel, and MarcoKã¶rner. "Deep residual learning for single-image super-resolution of multi-spectral satellite imagery." ISPRS Annals of the Photogrammetry, Remote Sensing and Spatial Information Sciences 4 (2019): 189-196 (Year: 2019).*

Pineda, Ferdinand, Victor Ayma, and Cã ©sar Beltran. "A generative adversarial network approach for super-resolution of Sentinel-2 satellite images." The International Archives of the Photogrammetry, Remote Sensing and Spatial Information Sciences 43 (2020): 9-14. (Year: 2020).*

International Search Report issued in International Application No. PCT/US2022/012661, mailed Apr. 1, 2022.

Written Opinion of the International Searching Authority issued in International Application No. PCT/US2022/012661, mailed Apr. 1, 2022.

International Preliminary Report on Patentability (Chapter 1 of the Patent Cooperation Treaty) issued in International Application No. PCT/US2022/012661, mailed Jul. 27, 2023.

* cited by examiner

*Primary Examiner* — Hadi Akhavannik

(74) *Attorney, Agent, or Firm* — Charles C. Achkar; Amster Rothstein & Ebenstein LLP

(57) ABSTRACT

A method of enhancing digital images of a parcel of land that includes providing a pair of coarse resolution and fine resolution orthophotos of a parcel of land to a model, training the model based on the orthophotos to obtain a trained model, and providing a coarse resolution image of another parcel of land to the trained model to obtain a fine resolution of another parcel of land.

9 Claims, No Drawings

ENHANCEMENT OF COARSE RESOLUTION IMAGERY USING SUPER-RESOLUTION AND CONVOLUTION NEURAL NETWORKS TO BE USED FOR FIT-FOR-PURPOSE SYSTEMATIC LAND TITLING AND LAND VALUATION

CROSS REFERENCE TO RELATED APPLICATIONS

The present application is a § 371 National Phase application based on PCT/US2022/012661 filed Jan. 17, 2022, which claims the benefit of Provisional application No. 63/137,842 filed Jan. 15, 2021, the subject matter of each of which is incorporated by reference in their entirety.

FIELD OF THE INVENTION

The disclosed invention relates a method and a system for fit-for-purpose systematic land titling and land valuation with satellite imagery of land parcels enhanced with a Super-Resolution Convolution Neural Network.

BACKGROUND OF THE INVENTION

Super-resolution is well-known for improving the resolution (i.e. enhancement) of a digital image.

For example, enlarging a digital image usually results in the loss of the resolution of the image. The resolution of an enlarged digital image may be improved using a Super-resolution method in order to lessen the negative effects of the enlargement.

Typically, enhancement of a digital image using a Super-resolution method is implemented by predicting the values of the pixels that are added to the original pixels (new pixels) of the original image to produce an image with better resolution.

Bicubic interpolation, Bilinear Interporation, and Nearest Neighbor are three known methods of predicting the values of the additional pixels.

Bicubic Interpolation uses sixteen pixels surrounding a pixel to predict the new pixel values.

Bilinear Interpolation uses four pixels surrounding a pixel to predict the new pixel values.

The Nearest Neighbor predicts the pixel values from the value of the nearest neighboring pixel through interpolation, for example.

These known methods do not provide satisfactory results consistently. For example, upscaling (enlargement) of a digital image enhanced with bicubic interpolation can blur the image, which is caused by the incorrect prediction of the new pixel values.

A Super-resolution method such as the Nearest Neighbor method uses information in the existing pixels to predict the values for the new pixels added to the image (for example, the enlarged image) to create an enhanced image.

A Super-resolution neural network can also create the missing pixel values for the coarse resolution digital image. However, a neural network does not use the existing pixels to predict the value of the new pixels in the same manner, but uses a trained neural network to predict the values for the new pixels that are to be added to a coarse resolution image to improve its resolution.

One may train to use a Super Resolution Convolutional Neural Network (SRCNN) to enhance (improve the resolution of) a digital image. A SRCNN employs three convolutional layers. Normally, a grayscale image is used to train a SRCNN.

Another known method involves training a Very Deep Super Resolution (VDSR) neural network, which employs multiple convolutional layers. The VDSR network may have 20 convolutional layers. The key element of VDSR is the residual learning applied by adding the input image to the output from the last convolutional layer to learn only the difference between fine and coarse resolution by the network.

Other methods of digital image enhancement using a neural network are also known.

To describe the quality of the results obtained from a neural network a metric must be defined that describes the similarity between the enhanced image and the full resolution image.

There are many known metrics that can be used. For example, Peak Signal to Noise Ratio (PSNR) is a known metric. Using PSNR the similarity between two images can be determined using the Mean-Square-Error (MSE) of the pixels and the maximum possible pixel value (MAXI). A high PSNR value means a high similarity between two images and a low value means a low similarity respectively.

The structural similarity index is another metric that can be used to improve PSNR by taking into account luminance, contrast and structure of both images.

Other known metrics are Information Fidelity Criterion, Weighted Peak Signal to Noise Ration, Multi Scale Structural Similarity.

SUMMARY OF THE INVENTION

A method as described herein is intended to be implemented with a computer or computers as needed to obtain a trained computer system that can devise a higher resolution image from a lower resolution image.

Currently, high-resolution imagery is commonly used for land titling and valuation. Capturing high resolution images is time-consuming and costly, however.

Satellite images are cheaper and are captured more frequently. However, satellite images have low resolution and do not provide accurate land surveying information required, for example, for a systematic land titling and valuation. The acceptable horizontal accuracy that is commonly used is in a range of 10-40 cm.

Modern machine learning algorithms can be used to increase the quality/resolution of satellite images of land parcels. The enhanced satellite imagery can lead to a more efficient fit-for-purpose land administration and valuation, for example.

An objective of the present invention is to create higher-resolution pixel information from lower-resolution images using a convolutional neural network and super-resolution techniques.

In a method according to the present invention, samples of high resolution digital images of parcels of land from a region and the satellite imagery of that entire region are used to train a machine learning model (i.e. a neural network) in order to devise a machine that can increase the resolution/quality of low resolution imagery of parcels of land from that region. The enhanced imagery produced by the trained machine can be used, for example, for a fit-for-purpose systematic land titling, valuation and surveying.

Furthermore, the enhanced imagery captured at different times can be used to detect changes to the land parcels in the region over time, which can be used for land valuation for the purpose of, for example, taxation.

A machine trained according to the present invention can increase the resolution of satellite imagery and terrain data of parcels of land in a given region.

The best available satellite imagery, which has a global coverage, has 30 cm resolution.

Using sample high-resolution imagery (5 or 10 cm) from a region and machine learning algorithms such as SRCNN, a machine trained as disclosed herein can enhance the satellite images of parcels of land from that region.

While SRCNN can generate sub-pixel information in imagery to increase the resolution of the image, the terrain data (Digital Surface Model) can be used, for example, to detect the presence of a structure or the height of the structure (e.g. a building). Such information can be used for valuation purposes.

Valuation of real estate is a very expensive process. Consequently, valuation of real estate is carried out every 5 or 10 years.

Real-time valuation would be possible with access to high-quality up-to-date imagery, which will make the real estate valuation process less expensive. Consequently, real estate valuation could be performed more often.

The following are some of the advantages of the disclosed invention:

1) the cost of image capturing is significantly reduced;
2) the disclosed method is a cost-efficient, reliable, scalable, and flexible approach that serves the purpose of the system instead of focusing on the most accurate and technical solution;
3) the disclosed method will allow for a mass registration of property rights in a short time frame;
4) the disclosed method will increase object detection performance by giving sharper and more defined roof boundaries, allowing for the improved accuracy of building footprint extraction from the enhanced image, which may allow for improved real estate valuation calculation.

Other features and advantages of the present invention will become apparent from the following description of the invention which refers to the accompanying drawings.

DETAILED DESCRIPTION OF EMBODIMENTS OF THE INVENTION

The first step in a method according to the present invention is training a model. To train a model, a pair of coarse resolution and fine resolution orthophotos are needed. Coarse resolution as used herein means a digital image with a lower resolution than the fine resolution image in the pair of orthophotos. The orthophotos are preferably aerial images geometrically corrected to have a uniform scale. The fine resolution and coarse resolution images should cover the exact same area on the ground. It is best to choose images that are captured around the same time or images from areas that have not had significant changes over time. The orthophotos are divided into 256 by 256 pixel images to be used in the training. So, for each small coarse resolution image, there is a corresponding fine resolution image to be used as a ground truth.

The input training images (orthoimages) are first augmented. Each training image may be augmented by flipping the image, adjusting the lighting of the image, randomly adding noise to the image, and so on. The image augmentation results in a more generalized model and decreases the chances of overfitting. One methodology involves starting with the training images, changing the images intentionally ("crappify) by adding, for example, artifacts to the images, reducing the resolution of the images, and obscuring parts of the images with random text. Then, the model is trained to "decrappify" the "crappified" images to return them to their original state. An example of this methodology can be found in the FastAI library (https://www.fast.ai/2019/05/03/decrappify/), which is implemented based on Pytorch, uses the U-Net architecture for the neural network pre-trained with resnet34 for both encoder and decoder and Pixel Shuffle upscaling with ICNR initialization. The "decrappification" method may also use transfer learning from pre-trained ImageNet models. Other techniques such as batch normalization, learnable blur, self-attention, discriminative learning rates and progressive resizing may also be used to improve the training process.

The loss function used in the method may be a perceptual loss function developed based on VGG-16 model, pixel loss and gram matrix loss. A Perceptual/Feature loss function developed by Johnson et al (2016) (https://arxiv.org/pdf/1603.08155.pdf) may be used in the training model. While a supervised feedforward convolutional neural network based on a per-pixel loss function can be used to train a model, such a model does not consider perceptual differences between output and validation benchmarks. The perceptual loss function used in the method according to the present invention does consider the main image features extracted from convolutional neural networks. Consequently, the disclosed method is more robust in identifying image similarities and more accurate in reconstructing fine details and edges.

After training the model, a coarse-resolution image may be provided to the trained model in order to refine the coarse-resolution image and obtain a fine-resolution image. The fine-resolution image can be then used in semantic segmentation, and image classification to identify all of the improvements in a parcel in order to have an accurate estimate of a house price. For example, buildings may be extracted using semantic segmentation and then each building is classified using image classification techniques. With the area and the type of improvements in a parcel obtained from the refined image as well as the height of the buildings captured from terrain data, the value of a house, for example, can be assessed according to an assessment formula.

What is claimed is:

1. A method of enhancing digital images of a parcel of land, comprising:

a) training a super resolution conventional neural network model to improve resolution of a digital picture, wherein the training includes:

providing a pair of orthophotos, where a first orthophoto is a coarse resolution orthophoto having a first resolution and a second orthophoto is a fine resolution orthophoto of a parcel of land having a second resolution, wherein the second resolution is higher than the first resolution, and wherein the the first orthophoto and the second orthophoto are aerial images covering an exact same ground area, and the second resolution is between 5 and 25 centimeters per pixel;

geometrically correcting the the first orthophoto and the second orthophoto to have a uniform scale;

training the model based on the corrected orthophotos to obtain a trained model; and b) providing a coarse resolution image of another parcel of land to the trained model as an input to obtain a fine resolution image of the another parcel of land as an output.

2. The method of claim 1, wherein the first orthophoto and second orthophoto are from a same time or are from areas that have not had significant changes over time.

3. The method of claim 1, wherein the training step further comprises dividing each of the first orthophoto and the second orthophoto into 256 by 256 pixel images, wherein each division of the first orthophoto corresponds to a division of the second orthophoto to be used as a ground truth.

4. The method of claim 1, further comprising augmenting the first orthophoto and the second orthophoto prior to the providing step.

5. The method of claim 4, wherein the augmenting step includes flipping or randomly adding noise to the orthophotos.

6. The method of claim 4, wherein the augmenting step includes changing the first orthophoto and the second orthophoto by adding artifacts to the first orthophoto and the second orthophoto or obscuring parts of the first orthophoto and the second orthophoto with random text.

7. The method of claim 1, further comprising using learnable blur, self-attention, discriminative learning rates or progressive resizing in the training step.

8. The method of claim 1, further comprising using a perceptual loss function in the training step.

9. The method of claim 1, further comprising identifying improvements in the fine resolution image of the another parcel of land by applying semantic augmentation and image classification to the fine resolution image of the another parcel of land.

* * * * *